United States Patent Office 3,530,121
Patented Sept. 22, 1970

---

3,530,121
BIOLOGICALLY ACTIVE SUBSTITUTED TRIAZINES
Werner Heimberger, Hanau am Main, Germany, assignor to Deutsche Gold- und Silber-Scheideanstalt vormals Roessler, Frankfurt am Main, Germany
No Drawing. Filed July 17, 1967, Ser. No. 653,663
Claims priority, application Germany, July 19, 1966, D 50,618; Dec. 22, 1966, D 51,843
The portion of the term of the patent subsequent to Aug. 19, 1986, has been disclaimed
Int. Cl. C07d 55/20
U.S. Cl. 260—240  9 Claims

---

ABSTRACT OF THE DISCLOSURE

Novel triazines of the formula

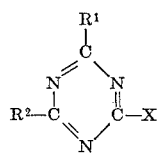

in which X is a cycloalkyl di-imine radical connected directly to the triazine nucleus over one of the nitrogens, preferably, piperazine or homopiperazine or their N'-alkyl or N'-hydroxyalkyl substitution products (wherein the alkyl or hydroxyalkyl groups contain 1–6 carbon atoms); $R^1$ is —$CCl_3$, —OAlk, —SAlk or

in which each of $R^3$ and $R^4$ can be hydrogen or lower alkyl (straight or branch chained) of 1–6 carbon atoms and Alk is alkyl of 1 to 6 carbon atoms; and $R^2$ is

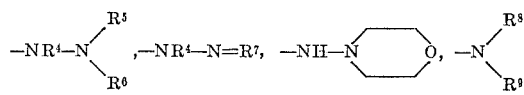

morpholino, piperidino, pyrrolidino or piperazino in which $R^5$ and $R^6$ have the same significance as $R^3$ and $R^4$ and in addition can be aryl, $R^7$ is lower alkylidine, cycloalkylidine or aralkylidine, $R^8$ and $R^9$ have the same significance as $R^3$ and $R^4$ and in addition can be morpholino alkyl, piperazino alkyl, homopiperazino alkyl, hydroxy alkyl or an alkylene diamine radical of 1–6 carbon atoms, the second nitrogen of which can be substituted by alkyl or phenyl. The novel compounds are useful as herbicides and especially as analgesic and/or antiinflammatory agents.

---

BACKGROUND OF THE INVENTION

The invention relates to novel s-triazine compounds carrying a cycloalkyl di-imine substituent such as piperazino and homopiperazino substituents.

It is known that 2,4-bisalkylamino-6-trichloromethyl-triazines can be produced by reacting 2,4,6-trichloro-methyl triazines or 2-amino-bistrichloromethyl triazines with amines or ammonia in the presence of catalytically active amounts of an alkali metal alcoholate (German Pat. 1,117,131). It also is known that triazines of the formula

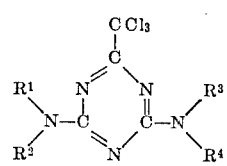

can be obtained by reaction of 2,4,6-tristrichloromethyl triazine with 2 mol of the corresponding amine or with 1 mol of each of two different amines (German Pat. 1,107,448). Such reactions have previously not been described with the much more sluggishly reacting cyclic amines. The reason for this may be that the substituents already present in the starting triazine, especially, tri-halogenmethyl groups can render further substituents very difficult.

SUMMARY OF THE INVENTION

Novel triazines of the formula

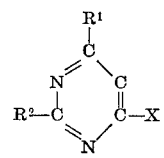

in which X is a cycloalkyl di-imine radical connected directly to the triazine nucleus over one of the nitrogens, preferably, piperazine or homopiperazine or their N'-alkyl or N'-hydroxyalkyl substitution products (wherein the alkyl or hydroxyalkyl groups contain 1–6 carbon atoms); $R^1$ is —$CCl_3$, —OAlk, —SAlk or

in which each of $R^3$ and $R^4$ can be hydrogen or lower alkyl (straight or branch chained) of 1 to 6 carbon atoms and Alk is alkyl of 1 to 6 carbon atoms; and $R^2$ is

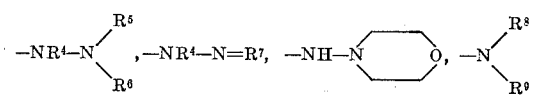

morpholino, piperidino, pyrrolidino or piperazino in which $R^5$ and $R^6$ have the same significance as $R^3$ and $R^4$ and in addition can be aryl, $R^7$ is lower alkylidine, cycloalkylidine or aralkylidine, $R^8$ and $R^9$ have the same significance as $R^3$ and $R^4$ and in addition can be morpholino alkyl, piperazino alkyl, homopiperazino alkyl, hydroxy alkyl or an alkylene diamine radical of 1–6 carbon atoms, the second nitrogen of which can be substituted by alkyl or phenyl. The novel compounds are useful as herbicides and especially as analgesic and/or antiinflammatory agents.

DETAILED DESCRIPTION OF THE INVENTION INCLUDING PREFERRED EMBODIMENTS

In the following description the trivalent s-triazine nucleus

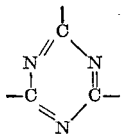

will, for simplicity's sake, be designated

The novel compounds according to the invention can, for instance, be prepared by the following methods:

(a) Reacting a compound of the formula

          II with hydrazine, phenyl hydrazine, amino morpholine, morpholine, piperazine, piperidine or pyrrolidine in suspension at room temperature or in the presence of an organic solvent, preferably, an alcohol and in the presence of an alkali metal alcoholate, preferably, sodium methylate, under reflux to produce a compound of the formula

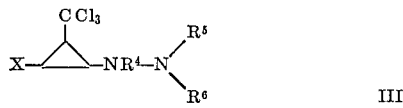          III or

          IV wherein A represents amino morpholino, morpholino, piperazino, piperidino or pyrrolidino and, if desired, the compound of Formula III with a ketone or aldehyde, if desired, in the presence of an organic solvent under reflux to produce a compound of the formula

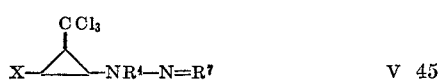          V wherein X, $R^4$, $R^5$, $R^6$ and $R^7$ have the same significance as above.

(b) Reacting a compound of Formula II with an excess of a compound of the formula

          VI or

          VII in which Y represents

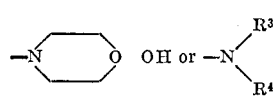

Alk' is a straight or branch chained alkylene of 1–6 carbon atoms, $R^3$ and $R^4$ have the significance given above and in addition can be hydroxy alkyl, at room temperature or under reflux in the presence of an alcohol or an organic solvent and an alkali metal hydroxide, or in the presence of an organic solvent and an alkali metal alcoholate.

(c) Reacting a compound of the formula

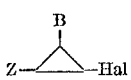          VIII in which Hal is a halogen atom, preferably Cl, B is the group —OAlk, —SAlk or

and Z is morpholino, piperidino, pyrrolidino, piperazino or

Alk signifying lower alkyl of 1 to 6 carbon atoms and $R^{10}$ and $R^{11}$ are each individually hydrogen, alkyl or hydrogen, alkyl or hydroxy alkyl with 1 to 6 carbon atoms, with a cycloalkyl di-imine corresponding to X either in suspension under reflux or in the presence of an organic solvent and an acid binding agent at room temperature.

(d) Reacting a trishalogen-s-triazine, preferably, trischloro-s-triazine, in the presence of an organic solvent, if necessary, with cooling, with an amine of the Formula VII, treating the reaction product without isolation with an alcohol and at least equimolecular quantities of an acid acceptor, preferably, an alkali metal alcoholate (the rection steps can be carried out in reverse order) and the solution of the reaction product is introduced without isolation into an alcoholic solution of a cycloalkyl di-imine corresponding to X to produce a compound of the formula

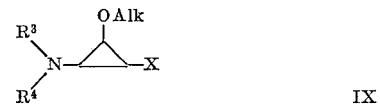          IX (e) Reacting a trishalogenmethyl-s-triazine, preferably, trichloromethyl-s-triazine, with a cycloalkyl di-imine corresponding to symbol X in the presence of an organic solvent at room temperature and heating the resulting solution with recovery of the reaction product with an amine of the Formula VII under reflux and recovering the produce

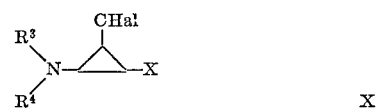          X in a manner known per se.

(f) Treating a compound of the formula

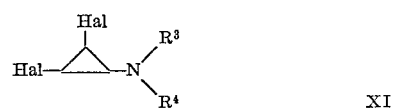          XI in which Hal signifies a halogen atom, preferably, chlorine and $R^3$ and $R^4$ have the same significance as above, in the presence of an organic solvent with a solution of an acid acceptor, preferably, a solution of an alkali metal or an alkyl metal hydroxide in an alkyl mercaptan and introducing the resulting solution into an alcoholic solution of a cycloalkyl di-imine corresponding to the symbol X, if necessary, with cooling and then recovering the compound of the formula

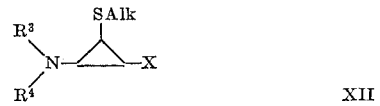          XII from the reaction mixture in a manner known per se.

The following ketones or aldehydes can be used for the subsequent conversion of compounds of the Formula III: acetone, methyl ethyl ketone, cyclohexanone, formaldehyde, acetaldehyde, benzaldehyde, nitrobenzaldehyde and the like.

In procedure (a) alkyl acetate, dioxane and the like can be used as solvent in place of the alcohols, especially the methanol.

The triazine compounds according to the invention tested were as follows (identification by substituents carried in the 2, 4 and 6 positions):

| | 2 | 4 | 6 |
|---|---|---|---|
| DW3115 | Cl$_3$C— | —NH—NH$_2$ | —N⟨H⟩NH |
| DW3536 | Cl$_3$C— | —N⟨H⟩NH | —NH—N=C(CH$_3$)$_2$ |
| DW3539 | Cl$_3$C— | —NH—N=CH—⟨phenyl⟩ | —N⟨H⟩NH |
| DW3543 | Cl$_3$C— | —N⟨H⟩N—CH$_3$ | —NH—NH$_2$ |
| DW3398 | Cl$_3$C— | —NHC$_2$H$_5$ | —N⟨H⟩NH |
| DW3533 | CH$_3$O— | —N⟨H⟩NH | —N⟨H⟩O |
| DW3862 | OHN— | —NHC$_2$H$_5$ | —N⟨H⟩N.HCl |
| DW3592 | CH$_3$S— | —NHCH(CH$_3$)$_2$ | —N⟨H⟩NH |
| DW3872 | Cl$_3$C— | —NH—N=CH—⟨phenyl⟩ | —N H NH.HOOC-CH=CH-COOH |
| DW3410 | OHN— | —NHC$_2$H$_5$ | —N⟨H⟩NH |

Alcohols and methylene chloride are preferred as the solvents for procedures (b), (c), (e) and (f). However, ethyl acetate, dioxane, aqueous methanol and water also come into question.

Acetone is the preferred solvent for procedure (d). However, methanol-water, acetone-water and water also can be used.

As the compounds according to the invention contain basic nitrogen atoms they can be converted into their salts in a known manner, for example, by treatment with organic or inorganic acids. The term salt is used herein not only to signify the usual acid addition salts of the type of the hydrogen halides but also the quaternary ammonium salts.

In the production of salts useful for the production of pharmaceuticals the usual acids employed in the production of nontoxic or pharmaceutically acceptable salts can be used. Examples of such acids, for instance, are sulfuric, phosphoric, hydrohalic, sulfamic, benzene sulfonic, p-toluene sulfonic, camphor sulfonic, guaiazulon sulfonic, maleic, fumaric, succinic, tartaric, lactic, titric, ascorbic, glycolic, salicyclic and the like acids.

The compounds according to the invention have biological activity and can be used as herbicides and especially as analgesics and/or antiinflammatory agents.

The therapeutic utility of the novel compounds according to the invention is illustrated by the following tests carried out on selected representative illustrated examples thereof.

The compounds in question were tested as to their antiinflammatory activity upon oral administration on carrageen edema of the rat paw according to the method of Domenjoz and Coll., Arch. Exp. Pharm. Pathol. 230, 327, 1957, as to their analgesic activity upon oral administration to mice according to the method of Haffner, Deutsche Medizinische Wochenschrift 55, 731, 1929, and as to their toxicity to mice and rats according to the method of Miller and Tainter, Proc. Soc. Exper. Biol. and Med. 57, 261, 1944. In the antiinflammatory action tests, the ED50 represents the doses required to effect a 50% suppression of the edema. In the analgesic action tests the ED50 represents the dose required so that 50% of the test animals do not exhibit the pain reaction.

In addition, phenyl butazone was tested as a comparison in the antiinflammatory action test and codeine was tested as a comparison in the analgesic action test.

The results of the tests are tabulated in the following:

TABLE 1.—ANTIINFLAMMATORY ACTION

| | ED$_{50}$ oral, mg./kg. | Therapeut. index | LD$_{50}$ rat oral, mg./kg. |
|---|---|---|---|
| DW3115 | 1.5 | 72 | 108±11 |
| DW3536 | 2.7 | 50 | 135±12 |
| DW3539 | 0.9 | ca. 1,000 | ca. 2,000 |
| DW3543 | φ | | |
| DW3398 | 1.4 | 43 | 61±5 |
| DW3533 | 7.8 | | |
| DW3862 | 2.0 | 350 | 700±124 |
| DW3592 | 6.0 | | |
| DW3872 | 1.2 | ca. 800 | ca. 1,000 |
| DW3410 | 2.0 | 319 | 638±60 |
| Phenyl butazone | 40.0 | 13 | 530±59 |

TABLE 2.—ANALGESIC ACTION

| | ED$_{50}$ oral, mg./kg. | Therapeut. index | LD$_{50}$ mouse oral, mg./kg. |
|---|---|---|---|
| DW3115 | 18±2 | 6.9 | 125±2.7 |
| DW3536 | 13±2 | 13 | 167±11 |
| DW3539 | 35±3.5 | 81 | 2,850±306 |
| DW3543 | 43±7.7 | 8.5 | 367±26 |
| DW3398 | φ | φ | |
| DW3533 | φ | φ | |
| DW3862 | φ | φ | |
| DW3592 | φ | φ | |
| DW3872 | 25±4 | 100 | 2,550±370 |
| DW3410 | φ | φ | |
| Codeine | 108±14 | 4.4 | 480±29 |

As can be seen from such tables, the compounds according to the invention can be classified in three group, namely:

(1) Compounds having both antiinflammatory and analgesic action: DW3115, DW3536, DW3539 and DW3872.

(2) Compounds only having an antiinflammatory action: DW3398, DW3533, DW3862, DW3592 and DW3410.

(3) Compounds only having analgesic action: DW3543.

The compounds according to the invention exhibiting antiinflammatory activity have a substantially higher activity than that of phenyl butazone in that their $ED_{50}$ is between about 0.9 and 7.8 mg./kg. oral as against about 40 mg./kg. and at the same time have a better therapeutic index, namely, 43 to about 2000 as against 13.

In addition, those compounds according to the invention exhibiting an analgesic activity have substantially better activity than codeine in that their $ED_{50}$ oral is between about 13 and 43 mg./kg. as against about 108 mg./kg. and at the same time have a better therapeutic index, namely, between 7 and about 100 as against 4.4.

The compounds according to the invention therefore have a stronger antiinflammatory and analgesic action than the known antiinflammatory compound phenyl butazone and the known analgesic codeine and furthermore they are better tolerated.

The indications as antiinflammatory agents are as follows:

Chronic arthritis
Illnesses of rheumatic nature
Post-traumatic inflammations
Swellings on fractures
Thrombophlebitis in every form (including post-operative)
Bursitis
Synovitis
Collagenoses (polymyositis, periarteritis)
Gout
Intraperitoneal adhesions
Indications as pain relieving agents:
Pains of all origins.

The novel compounds according to the invention can be used, if desired, also in combination with other medicaments, in the form of pharmaceutical compositions suited for enteral and parenteral application.

The enteral administration can, for instance, be effected in the form of tablets, capsules, pills, dragées, suppositories, oily and aqueous solutions or suspensions and emulsions. The parenteral administration can be effected in the form of injectable oily and aqueous solutions or suspensions and emulsions.

The dosage depending upon form of administration can be between 0.05 and 200 mg. one or more times a day.

The following examples will serve to illustrate the novel compounds according to the invention.

EXAMPLE 1

40 g. (1/10 mol) of 2,6-bis-trichloromethyl-2,4-piperazino-triazine were allowed to stand suspended at room temperature for 2 days in 90 g. of hydrazine hydrate. The conversion to 2-trichloromethyl-4-piperazino-6-hydrazino-triazine took place in heterogeneous phase. The compound was filtered off and washed neutral with water. 27 g., that is, 85.6% of theory, of the compound

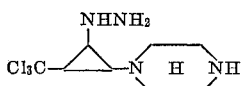

with a melting point of 167–169° C. were obtained.

31.25 g. (0.1 mol) of the thusly prepared compound were added portionwise to a solution of 11.6 g. (0.1 mol) of maleic acid in 400 ml. of methanol. After standing overnight the maleic acid addition salt produced which had crystallized out was filtered off, washed and dried. 37.8 g. of such salt or 88.4% of theory were obtained. Its melting point was above 350° C.

EXAMPLE 2

31.25 g. (0.1 mol) of 2-bis-trichloromethyl-4-piperazino-6-hydrazino-triazine produced as Example 1 were heated under reflux, suspended in 150 ml. of acetone. After 5 hours' boiling it went into solution. The excess acetone was then distilled off and the residue washed with water. 28.3 g., or 80.2% of theory, of 2-piperazino-4-trichloromethyl-6-isopropylidenehydrazino-triazine

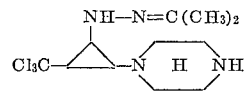

of a melting point of 164–168° C. were obtained.

The compound was reacted with maleic acid in methanol to form the maleic acid salt as in Example 1. However, it did not crystallize out and the solvent had to be distilled off and the residue stirred up with ether from which it completely crystallized. After filtering off and drying, 36 g. of the maleic acid salt of a melting point over 360° C. were obtained. The yield was 76.8% of theory.

EXAMPLE 3

41.4 g. (0.1 mol) of 2,6-bis-trichloromethyl-4-homopiperazino-triazine (produced from 1 mol tris-trichloromethyl-s-triazine and 1 mol of homopiperazine acetate) were stored for 2 days at room temperature with 89.9 g. (1.8 mol) of hydrazine hydrate. The conversion to 2-trichloromethyl - 4 - homopiperazino - 6 - hydrazino-triazine took place in heterogeneous phase. The crystalline portion was filtered off and washed several times with water. The yield of the 6-hydrazino substituted compound was 27.4 g. or 84.1% of theory. Its melting point was 161–165° C.

EXAMPLE 4

The product of Example I was reacted in a manner analogous to Example 2 using benzaldehyde instead of the acetone. 35 grams of the 2-trichloromethyl-4-piperazino-6-benzylidinehydrazino-triazine

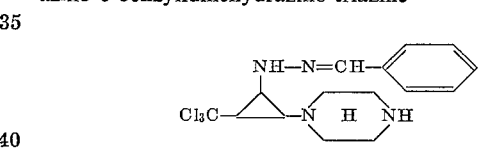

of a melting point of 185 to 190° C. were obtained. The yield was 87.4% of theory.

The maleic acid addition salt was prepared therefrom in a manner analogous to Example 2.

The yield of such acid addition salt was 67.3% of theory and had a melting point of 198° C. with decomposition.

EXAMPLE 5

Analogously to Example 1, 41.4 g. (0.1 mol) of 2,6-bis - trichloromethyl - N - methylpiperazino-triazine were reacted with hydrazine hydrate. 28.6 g. of 2-trichloromethyl-4-N-methylpiperazino - 6 - hydrazino-triazine

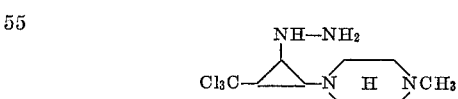

with a melting point of 175° C. with decomposition were obtained. The yield was 87.6% of theory. The maleic acid salt which was prepared therefrom in a manner analogous to Example 2 was obtained in a yield of 81% of theory and had a melting point of 185° C. with decomposition.

EXAMPLE 6

40.0 g. (0.1 mol) of 2,6-bis-trichloromethyl-4-piperazino-triazine were heated under reflux with 43.2 g. (0.3 mol) of N-3-aminopropyl-morpholine for 3 hours in a solution of 0.4 g. Na in 300 ml. of methanol. The methanol was then distilled off and the viscous residue taken up in methylene chloride and washed several times with water. The methylene chloride solution was concentrated. The residue crystallized upon standing and was washed with water. 32 g. of the 2-tri-chloromethyl-4-piperazino-6-(3-N-morpholinyl-propyl-1-amino)-triazine

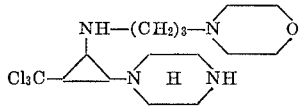

of a melting point of 90–93° C. were obtained. The yield was 75.5% of theory.

EXAMPLE 7

41.4 g. (0.1 mol) of 2,6-bis-trichloromethyl-4-homopiperazino-triazine were heated under reflux with 18.3 g. (0.3 mol) of ethanolamine in 300 ml. of methanol for 5 hours. The subsequent processing was analogous to that of Example 6. 25.5 g. of 2-trichloromethyl-4-homopiperazino-6-ethanolamino-triazine

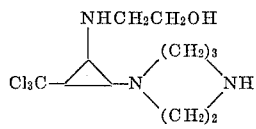

of a melting point of 118–122° C. were obtained. The yield was 71.6% of theory.

EXAMPLE 8

40 g. of 2,6-bis-trichloromethyl-4-piperazino-triazine were heated under reflux with 22.2 g. (0.3 mol) of 2-methyl ethylene diamine for 3 hours in a solution of 0.4 g. of Na in 300 ml. of methanol. The subsequent processing was analogous to that of Example 6. 30 g. of 2-trichloromethyl - 4 - piperazino-6-(2-methyl)-ethylene diamino-triazine

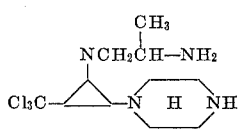

of a melting point of 141–144° C. were obtained. The yield was 84.5% of theory.

EXAMPLE 9

40 g. (0.1 mol) of 2,6-bis-trichloromethyl-4-piperazino-triazine were added with stirring and cooling into 35 ml. of ethylene diamine (0.5 mol) whereupon solution occurred. After about 15 minutes precipitation of the partly crystalline product began. After standing at room temperature for 4 hours the reaction mixture was stirred up with about 400 ml. of water and the 2-trichloromethyl - 4 - piperazino-6-ethylene diamine-triazine which had crystallized was filtered off. 30.5 g. of

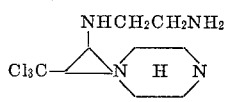

of a melting point of 130–137° C. were obtained. The yield was 89.5% of theory.

EXAMPLE 10

40 g. (0.1 mol) of 2,6-bis-trichloromethyl-4-piperazino-triazine were heated under reflux with 36 g. (0.4 mol) of 50% ethyl amine in a solution of 0.2 g. NaOH in 300 ml. of methanol for 5 hours whereby solution occurred. The subsequent processing was analogous to that of Example 6. 27 g. of 2-trichloromethyl-4-piperazino-6-ethylamino-triazine with a melting point of 138–142° C. were obtained. The yield was 83.8% of theory.

The triazine compound thus obtained was introduced into methanol containing an equimolar proportion of gaseous HCl whereupon solution occurred with warming. Upon standing overnight the salt crystallized out in a yield of 81.6% of theory. Its melting point was 270° C. with decomposition.

EXAMPLE 11

24 g. (about 0.1 mol) of 2-methoxy-4-chloro-6-morpholino-triazine were introduced into a solution of 18.1 g. (0.2 mol) of piperazine in 200 ml. of methanol while stirring. After solution occurred the reaction mixture was permitted to stand overnight and the methanol then distilled off. The residue was taken up in methylene chloride and dilute aqueous HCl added whereby the triazine derivative transferred to the aqueous phase and all impurities remained in the methylene chloride. The triazine derivative was then precipitated from the HCl solution with NaOH and taken up in methylene chloride. The methylene chloride was distilled off and the residue washed with water whereby 21.0 g. of 2-methoxy-4-piperazino-6-morpholino-triazine of a melting point of 130–134° C. were obtained. The yield was 71.4% of theory.

EXAMPLE 12

20.5 g. (0.1 mol) of 2-methoxy-4-chloro-6-ethanolamino-triazine were introduced into a solution of 18.1 g. (0.2 mol) of piperazine in 200 ml. of methanol while stirring until solution occurred. The subsequent processing was analogous to that of Example 11. 18.1 g. of the 2-methoxy-4-piperazino-6-ethanolamino-triazine of a melting point of 116–120° C. were obtained. The yield was 71.2% of theory.

EXAMPLE 13

18.85 g. (0.1 mol) of 2-methoxy-4-chloro-6-ethylamino triazine were reacted with 18.1 g. (0.2 mol) of piperazine and the reaction mixture processed as in Example 11. 18.1 g. of 2-methoxy-4-piperazino-6-ethylamino-triazine of a melting point of 85–90° C. were obtained. The yield was 73% of theory.

EXAMPLE 14

43.2 g. (0.2 mol) of 2-ethylamino-4-chloro-6-isopropylamino-triazine were suspended in 400 ml. of ethanol and 116.4 g. of piperazine hexahydrate (0.6 mol) added and the mixture heated under reflux for 1 hour. The solvent was distilled off and the residue taken up in methylene chloride and washed several times with water. After the methylene chloride was distilled off, 41 g. of 2-ethylamino-4-piperazino-6-isopropylamino-triazine of a melting point of 127–132° C. were obtained. The yield was 77.4% of theory.

EXAMPLE 15

24 g. (0.1 mol) of 2-ethylamino-4-chloro-6-morpholino-triazine were suspended in 100 ml. of ethanol and 25.8 g. (0.3 mol) of piperazine added thereto. The mixture was heated under reflux for 30 minutes to effect solution. After the alcohol was distilled off the residue was taken up in methylene chloride and washed several times with water. After the methylene chloride was distilled off the syrupy residue was stirred up with ethyl ether whereupon the 2-ethylamino-4-piperazino-6-morpholino-triazine crystallized out. 22.5 g. thereof with a melting point of 110–112° C. were obtained. The yield was 77% of theory. The hydrochloride salt thereof was prepared in a manner analogous to that employed in Example 10. 32.1 g. of the hydrochloride with a melting point of 176–178° C. with decomposition were obtained. The yield was 97.5% of theory.

EXAMPLE 16

92 g. (0.5 mol) of tris-chloro-triazine were dissolved in 400 ml. of acetone and 85 ml. of acetone and 85 ml. (1.0 mol) of isopropylamine added at 0° C. with cooling. The suspension which formed was poured into water and the oily product which precipitated dissolved in 300 ml. of methylene chloride, dried and concentrated to ½ its volume under vacuum at 30° C. Then 100 ml. of methanol were added and a solution of 11.5 g. (0.5 mol) of Na in 250 ml. of methanol added gradually while stirring at 0° C. The resulting reaction solution containing 2- methoxy-4-chloro-6-isopropylamino-triazine were then added at 30° C. while stirring in a solution of 86 g. (1.0 mol) of piperazine in 200 ml. of methanol. After 4 hours' standing at room temperature, the solvents were distilled off and the residue taken up with methylene chloride and washed several times with water. The methylene chloride was distilled off and after several hours the residue crystallized. 75 g. of 2-methoxy-4-piperazino-6-isopropylamino-triazine of a melting point of 119–122° C. were obtained. The yield was 59% of theory.

EXAMPLE 17

86.6 g. of tris-trichloromethyl-triazine were suspended in 200 ml. of methanol and 26 g. (0.2 mol) of N-β-hydroxyethylpiperazine added thereto. Solution occured after standing overnight with conversion to 2,4-bis-trichloromethyl-6-N'-β-hydroxyethylpiperazino-triazine. The reaction solution was then heated under reflux for 3 hours with 54 g. (0.6 mol) of 50% ethylamine. The solvent was distilled off to a far reaching degree at 40° C. under vacuum whereby 2-trichloromethyl-4-ethylamino-6-N'-β-hydroxyethyl-piperazino-triazine crystallized out. After filtering, washing with 1:1 water-methanol and drying, 50.5 g. or 68.4% of theory of pure product of a melting point of 156–158° C. were obtained.

EXAMPLE 18

41.4 g. (0.2 mol) of 2,4-dichloro-6-isopropylamino-triazine were dissolved in 300 ml. of methylene chloride and a solution of 4.6 g. of Na and 9.6 g. (0.2 mol) methyl mercaptan in 100 ml. of methanol added slowly while stirring and cooling to 5–10° C. The NaCl produced was separated off and the resulting solution slowly added while cooling to 40° C. to a solution of 34.4 g. (0.4 mol) of piperazine in 100 ml. of methanol. After standing overnight the reaction mixture was washed with water to remove the methanol and excess piperazine. After drying over $Na_2SO_4$ the methylene chloride was distilled off. The resulting crystal paste was stirred up with ethyl ether to obtain 23.6 g. of 2-methylmercapto-4-piperazino-6-isopropylamino-triazine of a melting point of 117–121° C. The yield was 44% of theory.

The product was converted to the maleic acid addition salt in the manner described in Example 1 of a melting point of 182° C. with decomposition. The yield was 92.2% of theory.

What is claimed is:

1. A triazine compound selected from the group consisting of triazines of the formula

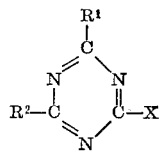

in which X is a member selected from the group consisting of piperazino, homopiperazino, and their N'-alkyl and N'-hydroxy alkyl substitution products in which alkyl is of 1 to 6 carbon atoms, $R^1$ is a member selected from the group consisting of —$CCl_3$, —OAlk and —SAlk in which alk is alkyl of 1 to 6 carbon atoms and $R^2$ is a member selected from the group consisting of

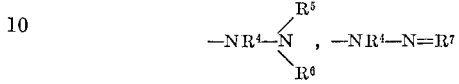

and morpholino in which each of $R^4$, $R^5$ and $R^6$ are selected from the group consisting of hydrogen and alkyl of 1 to 6 carbon atoms, and $R^7$ is alkylidene of 1 to 6 carbon atoms; and the pharmaceutically acceptable acid addition salts thereof.

2. The compound of claim 1 designated 2-trichloromethyl-4-piperazino-6-hydrazino-triazine.

3. The compound of claim 1 designated 2-piperazino-4-trichloromethyl-6-isopropylidenehydrazino-triazine.

4. The compound of claim 1 designated 2-trichloromethyl-4-homopiperazino-6-hydrazino-triazine.

5. The compound of claim 1 designated 2-trichloromethyl-4-piperazino-6-benzylidenehydrazino-triazine.

6. The compound of claim 1 designated 2-trichloromethyl-4-N-methylpiperazino-6-hydrazino-triazine.

7. The compound of claim 1 designated 2-trichloromethyl-4-N-methylpiperazino-6-hydrazino-triazine.

8. The compound of claim 1 designated 2-methoxy-4-piperazino-6-morpholino-triazine.

9. The compound of claim 1 designated 2-trichloromethyl-4-piperazino-6-ethylamino-triazine.

References Cited

UNITED STATES PATENTS

| | | | |
|---|---|---|---|
| 3,086,855 | 4/1963 | Knusli et al. | 260—249.9 XR |
| 3,103,512 | 9/1963 | Weiberg | 260—249.9 |
| 3,178,431 | 4/1965 | Staehelin et al. | 260—249.6 |
| 3,382,221 | 5/1968 | Petropoulos et al. | 260—249.6 XR |
| 3,310,557 | 3/1967 | Kleemann | 260—249.6 |

OTHER REFERENCES

Smolin et al.: "s-Triazines and Derivatives," Interscience Pub. Inc., New York (1959) pp. 360–3.

HENRY R. JILES, Primary Examiner

J. M. FORD, Assistant Examiner

U.S. Cl. X.R.

71—93; 260—247.5, 249.6, 249.8, 249.9, 999